United States Patent Office.

LUTHER L. SMITH, OF BROOKLYN, NEW YORK.

Letters Patent No. 100,202, dated February 22, 1870.

IMPROVED NEGATIVE PLATE FOR A "SMEE" BATTERY.

The Schedule referred to in these Letters Patent and making part of the same.

*To all whom it may concern:*

Be it known that I, LUTHER L. SMITH, of the city of Brooklyn, State of New York, have invented an Improved Method of Making the Negative Plate for a Smee Battery.

The ordinary negative plates for a Smee battery are made of solid silver, or of copper, brass, lead, or some other metal covered with a coating of silver.

I have discovered that a solid nickel plate or a plate made of copper, brass, lead, or some other metal, and covered with a coating of nickel, is a better negative plate for a Smee battery than the solid silver plate or the metallic plate coated with silver which is ordinarily used for such negative plate.

In the first place the solid nickel or nickel-covered plate is cheaper than solid silver or the silver-covered plate.

In the second place it is equally good in all other respects, and is not so liable to be amalgamated with the quicksilver used about the zinc plates of all Smee batteries as is the ordinary solid silver or silver-covered plate.

The forming of this amalgam always impairs the efficiency of the Smee battery, and as quicksilver is used about the zinc plates of all Smee batteries and amalgamates much more easily with silver than with nickel, a solid nickel plate or a nickel-covered plate is better than a solid silver or a silver-covered plate for the negative plate of the Smee battery.

In practice the plates may be covered or coated with nickel by the process described in Letters Patent issued to Isaac Adams, Jr., dated August 3, 1869 for improvements in the electro-deposition of nickel, which process gives a good and sufficient coating, but I do not claim that they can be coated by that process only.

The solid nickel plates may be made by casting or by the electro-deposit of a thick layer of nickel and afterward removing the same from the surface on which it has been deposited.

What I claim as my invention and discovery, and desire to secure by Letters Patent, is—

1. The making and use of a solid nickel plate or of a plate made of copper, brass, lead, or any other metal, and coated with nickel, as a negative plate for a Smee battery.

2. A solid nickel plate or a plate made of copper, brass, or any other metal, and coated with nickel, to be used for a negative plate for the Smee battery, as a new article of manufacture.

The above specification of said invention signed and witnessed at New York city this 14th day of August, 1869.

LUTHER L. SMITH.

Witnesses:
FRANCIS B. ANTZ,
CHARLES C. BEAMAN, Jr.